Jan. 6, 1925

M. JOHNSON

CREAM SIPHONING DEVICE

Filed Feb. 26, 1921

1,522,300

Inventor
Michael Johnson,
By Watson E. Coleman
Attorney

Patented Jan. 6, 1925.

UNITED STATES PATENT OFFICE.

MICHAEL JOHNSON, OF BAYSIDE, CALIFORNIA.

CREAM-SIPHONING DEVICE.

Application filed February 26, 1921. Serial No. 448,208.

*To all whom it may concern:*

Be it known that I, MICHAEL JOHNSON, a citizen of the United States, residing at Bayside, in the county of Humboldt and State of California, have invented certain new and useful Improvements in Cream-Siphoning Devices, of which the following is a specification, reference being had to the accompanying drawings.

In pouring off cream accumulating on the top of fresh rich milk, considerable of the cream is lost, and this is especially true in regard to milk served in bottles, such as are now used, as the entire quantity of milk becomes shakened up or displaced from its settled condition, when the bottle is tilted.

Therefore it is the purpose of the present invention to provide a siphoning device for drawing off the entire quantity of cream accumulative on the top of milk, and in accomplishing it, it is the aim to employ a siphoning tube, which is movable vertically as the level of the cream lowers, to insure siphoning off the entire supply of cream.

Another purpose consists in the provision of a receiving receptacle having a cap provided with an air tight joint with the receptacle, there being a sliding connection with the sectional siphoning tube, whereby the cream may be entirely siphoned off the top of the milk.

Still another purpose comprises the provision of a pneumatic means carried by the cap, for creating a suction in the receiving receptacle, whereby the cream on the top of the milk in the bottle or other receptacle may be effectively siphoned off in its entirety.

While the design and construction at present illustated and set forth is deemed preferable, it is obvious that as a result of a reduction of the invention to a more practical form for commercial purposes, the invention may be susceptible of changes, and the right to these changes is claimed provided they are comprehended within the scope of what is claimed.

The invention comprises further features and combination of parts, as will be hereinafter set forth, shown in the drawings and claimed.

In the drawings:—

Figure 1:
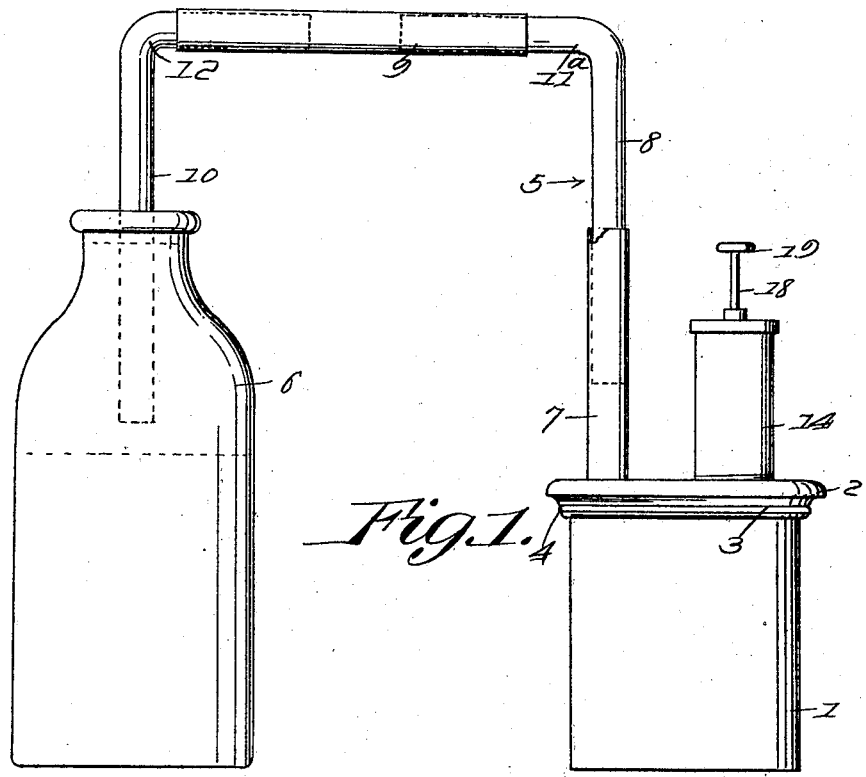
Figure 1 is a view in side elevation showing the improved siphoning device constructed in accordance with the invention and illustrating the siphoning tube with one of its arms just below the hightest level of the cream in the bottle or other receptacle.
Figure 2:
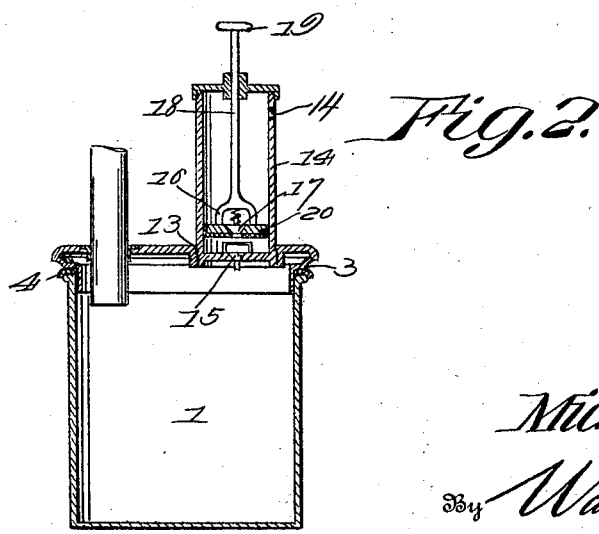
Figure 2 is a vertical sectional view through the siphoning device, showing one of the arms of the siphoning tube below the lowest level of the cream in the bottle or other receptacle, and illustrating the cream which has been siphoned off from the bottle as being retained in the receptacle carrying the siphoning device.

Referring to the drawings, 1 designates a receptacle preferably constructed of glass or other similar suitable material, and 2 denotes a cap, which is provided with an air tight joint 3 with the upper margin of the receptacle 1. This joint comprises a rubber gasket 4, which engages between the cap and the edge of the receptacle.

A siphoning tube designated as a whole by the numeral 5, and which is designed to communicatively connect the receptacle 1 and the bottle or other receptacle 6, in which the milk is contained. The siphoning tube 5 comprises a plurality of sections 7, 8, 9 and 10. The section 7 has an air tight joint 11 with the cap 2, in order to prevent the escape of air, and also to insure the proper suction or siphoning effect in the receptacle and the tube. The section 7 is movable through the cap so that the siphoning tube may be adjusted. The section 8 of the siphoning tube has an air tight telescopical fitting engagement with the section 7, so that the siphoning tube may accommodate itself to milk bottles of different heights. The sections 8 and 10 have right angle elbows 11ª and 12, which telescope into the section 9, in such wise as to prevent escape of air. The telescopical connections of the elbows 11ª and 12, with the section 9, enables the receptacle 1 to be adjusted toward and from the bottle or other receptacle, when siphoning liquid from the bottle. The section 10 of the siphoning tube extends into the milk bottle or other receptacle 6 so that its lower extremity may extend just below the level of the cream on top of the milk, and it is obvious that when the cream is being siphoned from the bottle, the sections 8, 9 and 10 may be lowered automatically as the level of the cream lowers, so that the cream in its entirety may be completely removed from the top of the milk.

Carried by the cap 2, preferably screw threaded thereto as at 13 is a cylinder 14 of a pneumatic pump. The bottom of the pump is provided with a check valve 15, which is adapted to open on the upward stroke of the plunger 16 and close on the downward stroke, while the plunger is provided with a check valve 17 to close on the upward stroke creating a suction in the receptacle 1, and open on the downward stroke, that is to say when siphoning the cream from the top of the milk. The plunger 16 has a plunger rod 18, which is provided with a handle 19. Reciprocating movements of the plunger will cause a suction in the receptacle 1 and in the siphoning tube, which will siphon or draw off the cream from the top of the milk in the bottle or other receptacle 6.

The plunger 16 has the usual packing 20, to insure a tight sliding fit of the plunger in the cylinder 14. However in order to discharge the contents of the receptacle 1, the section 7 of the siphoning tube may be lowered so that its lower end may approximate with the receptacle 1, and then the rod 21 may be disposed against the action of the spring 23, holding the check valve 17 closed, and in this case the plunger may be used for forcing air into the receptacle 1, enabling the contents of the receptacle to be discharged. The upper part of the cylinder 14 has an opening, to intake and expel the air above the plunger during the operation of the plunger.

Very often in removing cream from the top of milk, the container is very large in diameter, and in using siphoning tubes which are rigid throughout their lengths, it is necessary to extend the siphoning tube into the cream at a point adjacent the slide of the container, in order to place the cream receiving receptacle in close position to the container. With this method it has been discovered that all the cream is not removed, for the suction created has a tendency to follow the side of the container, and instead of siphoning pure cream, considerable of the milk is drawn off with the cream, whereas if the siphoning tube can be moved all over the surface of the cream, particularly in the center, as the level of the cream lowers, practically the entire amount of cream can be removed from the milk, without the milk being drawn off. Siphoning tubes of different lengths have been used, also siphoning tubes adjustable vertically have been employed, in order to accommodate the removing of cream from the upper surface of the milk in containers, such as milk bottles. In dairies on the farms, or in large dairies in cities, where big receptacles or stone crocks are used to contain the milk it would not be possible to adjust the receiving receptacle for the cream in close position to the container, and yet maintain the siphoning tube in a position to extend into the center of the cream, or from one place to another over the entire surface of the cream, unless the siphoning tube could be constructed, so that it is extensible laterally, whereby the receiving receptacle may be adjusted laterally toward and from the container. In the present case the siphoning tube has a horizontal part, consisting of slidably connected tight fitting extensible sections, permitting the receiving receptacle to not only be adjusted toward and from the container, but will permit the siphoning tube to extend into the center of the cream, and at the same time to move from place to place over the surface of the cream, in case the container is of considerable diameter.

The invention having been set forth, what is claimed as being useful is:

In combination with a receiving receptacle having a cap detachably connected thereto, a sleeve extending through the cap, pumping means carried by the cap, a tube adjustably mounted within the sleeve, the upper end of said tube being disposed at right angles to the sleeve, an extension sleeve carried by the right angularly extending end of the tube, a second tube having one end thereof adjustably disposed within the extension sleeve and its opposite end portion extended at right angles and adapted to extend into a receptacle in parallel relation to the first mentioned sleeve, said first mentioned sleeve serving as a support for both of said tubes and the extension sleeve.

In testimony whereof I hereunto affix my signature.

MICHAEL JOHNSON.